Jan. 12, 1971 H. GUJER 3,553,844
METHOD AND MEANS FOR CONTINUOUSLY DRYING WET
ORGANIC WASTE MATTER, PARTICULARLY FRESH
SLUDGE, THROUGH AEROBIC PRECOMPOSTING
Filed Dec. 3, 1968 4 Sheets-Sheet 1

HANS GUJER
INVENTOR.

BY Jacobi & Davidson
Attorneys

Hans Gujer
INVENTOR.

BY Jacobi & Davidson
Attorneys

United States Patent Office 3,553,844
Patented Jan. 12, 1971

3,553,844
METHOD AND MEANS FOR CONTINUOUSLY DRYING WET ORGANIC WASTE MATTER, PARTICULARLY FRESH SLUDGE, THROUGH AEROBIC PRECOMPOSTING
Hans Gujer, Glattalstrasse 149,
Rumlang, Switzerland
Filed Dec. 3, 1968, Ser. No. 780,829
Claims priority, application Switzerland, Dec. 4, 1967, 17,015/67
Int. Cl. F26b *3/00*
U.S. Cl. 34—9        26 Claims

ABSTRACT OF THE DISCLOSURE

A method and means for drying wet organic waste matter, particularly fresh sludge, through aerobic precomposting is disclosed. In the method wet organic waste matter is continuously added to a bed of precomposting decaying matter in such proportions that the moisture balance is not effected to the point of halting the process. Constant recirculation of the material in the bed is conducted in order to keep the bed relatively loosely arranged so that sufficient air is available throughout the bed. The preferred apparatus includes an annular shaped receptacle with a work platform suspended above on which are mounted a circulating device, a feeding device, and a removal device. In the preferred embodiments, either the annular receptacle revolves or, alternatively, the annular receptacle remains stationary while the work platform revolves around the same.

---

This invention relates to a method for continuously drying wet organic waste matter, and particularly fresh sludge aerobic precomposting, said wet waste matter having a water content exceeding the water content normally suitable for precomposting and wherein the precomposting decaying matter is provided for in a bed of approximately uniform height throughout. This invention also relates to a means for carrying out such a method, having an annular receptacle, with a feeding device and a turning device extending over the entire width of the annular receptacle.

The prerequisite for aerobic decomposition of organic waste materials is that the organisms have sufficient oxygen and water at their disposal for their metabolic process. In order to insure these conditions, the decaying matter must be arranged such that sufficient air is admitted throughout the bed. Besides, it must have a water content of more than 30% so that it still permits the metabolic exchange via the water. During aerobic decomposition, characteristic temperatures of up to 70° C. are usually developed. In extreme cases, the development of heat can reach such a degree that it results in spontaneous combustion of the decaying matter. The ideal temperature for the decomposition process in composting installations for aerobic decomposition of organic waste matter lies ideally between 55° and 60° C. This temperature of the decaying matter is maintained by the addition of fresh air, the partial evaporation of water, and the release of heat to the environment.

A method is known in the prior art for the aerobic composting of organic waste matter wherein the composting decaying matter is subjected to decomposition with heat in a bed which is essentially horizontal and of at least approximately constant depth. Fresh waste material, which is proportionately little in relation to bed mass, is fed to the bed uniformly along one side of the same. The bed mass is turned periodically and conveyed to a discharge side lying opposite the feeding side of the bed. In order to maintain uniform bed depth, as fresh waste matter is fed to the bed at its feeding side, an equivalent amount of decaying matter must be removed at the discharge side. It is essential in this known method that the fresh waste matter is fed to the bed mass at its feeding side only along an extremely limited strip. The decaying matter then traverses the bed from the feeding side to the discharge side and is there by subjected to the individual phases of the aerobic decomposition. It is a great disadvantage in this known method that the fresh waste materials can be fed only in a relatively dry condition. If the fresh waste materials which are being fed to the bed are too moist, the destruction of the cells developed during the beginning compost process results in excessive moisturization of the decaying matter, thus resulting in the formation of lumps. The decaying matter thereupon lumps together and the air required for aerobic composition can no longer penetrate. As a result, the aerobic decomposition process comes to a halt and changes into the undesired anaerobic decomposition process which is associated with unpleasant odors. Since, in this known method, the addition of fresh waste material which is too moist brings the desired aerobic decomposition process to a standstill, the fresh material must be added in as dry a state as possible. This, however, results in the decaying matter becoming too dry during the aerobic decomposition, so that water must be added.

It has been shown in practice that, for use in this known method, waste material which is composed of coarse particles, for example, refuse, may have at most about 50% by weight of initial water content and sewage silt alone may have at most about 40% by weight initial water content. This results in making it necessary that the waste material to be composted, and particularly sewage silt, be intensively pretreated in order to reduce the water content to the required limit. This is particularly pertinent in processing sewage silt alone from which sufficient water can be extracted relatively simply by mechanical means to bring the water content only to about 60–70%. On the other hand, the dewatering required for achieving the 40% water content, as is necessary nowadays, is only possible through expensive thermal methods.

The primary object of the present invention is, therefore, to provide a method and means which are free of the aforementioned and other such disadvantages.

Another object of the present invention is to provide a method and means wherein wet organic waste matter, particularly fresh sludge, can be continuously dried in a simple and relatively inexpensive manner through an aerobic precompost process.

More specifically, an object of the present invention is to provide a method for continuously drying wet organic waste matter, particularly fresh sludge, through an aerobic precompost process, said wet waste matter having a water content exceeding that which is normally suitable for a precompost process, wherein the precomposting decaying matter is provided for in a bed of approximately uniform height throughout.

It is yet another object of the present invention, consistent with the preceeding object, to provide a method for continuously drying wet organic waste matter, particularly fresh sludge, wherein the bed of approximately uniform height throughout is such that in the area extending over the entire length of a first dimension of said bed and over the entire length of a second dimension of said bed, lying transversely to said first dimension, there is mixed into the bed mass in a finely distributed manner relatively little fresh waste material in relation to the bed mass, said fresh waste material having a water content exceeding that suitable for the precompost process, and said bed mass possessing a water content suitable for a precompost process, turning the bed mass periodically, and continuously removing precomposted decaying matter.

It is a further important object of the present invention to provide a means for continuously drying wet organic waste matter, particularly fresh sludge, which includes an annular receptacle having a feeding device which is constructed such that it spreads the fresh waste material at least over a part of the entire width of the annular receptacle, and a turning device extending over the entire width of the annular receptacle and having a vertically arranged conveyor belt having tear-up teeth, said conveyor belt being at an angle to the radius of the annular receptacle and being inclined against the discharge side of the same.

These and other objects of the present invention will in part be described and in part become apparent when considering the following description taken in conjunction with the annexed drawings.

Figure 1:
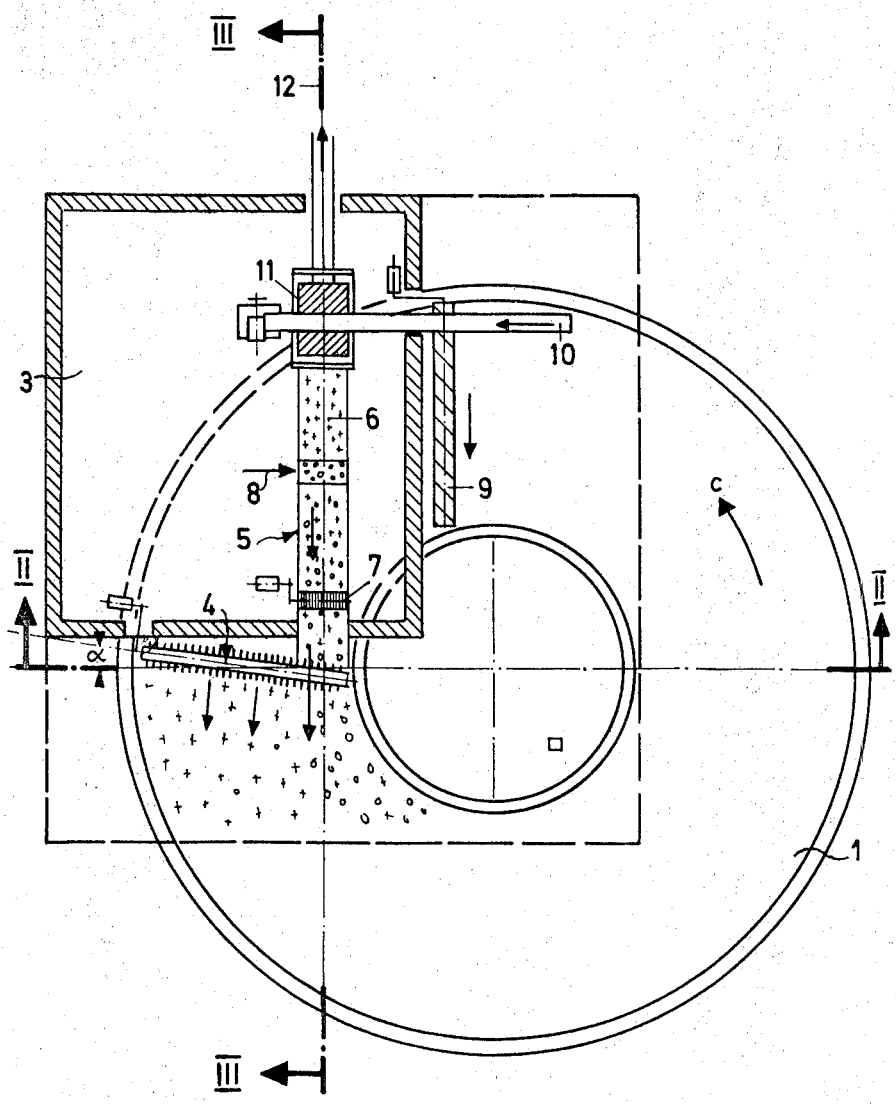
FIG. 1 is a top plan view of a drying device having an annular revolving receptacle in accordance with the present invention.

It should be recognized at the outset that the low water content required for the fresh waste material is not a necessary characteristic of aerobic decompostion processes as such, but it is a result of the heretofore used method of operation. Tests have shown that sewage silt, for example, having 70% water content can be subjected to an aerobic decomposition process without any further treatment, if the fresh refuse material is loosely distributed in a thin layer. Within 24 hours a self-heating of up to about 50°–60° C. occurs, without annoying odors, thus proving that the aerobic decomposition process has begun. However, the loose structure of the waste material collapses during the subsequent hours and impacts into a compact mass with free water running out of the same. The cause for this rapid structural collapse can be seen in the fact that the organisms which produce the decomposition process break through the cell walls of the sludge, thereby allowing the cell water to run out. In this simple test, however, the aerobic decomposition process of the decaying matter comes to a standstill since the compact mass of the decaying matter prevents the admission of air required for the aerobic decomposition process.

It is against this background that the instant method becomes important in that it assures that the decaying matter retains its loose structure even during that phase of the aerobic decomposition process wherein cell water is released, insuring the admission of a sufficient amount of air. This is achieved, primarily, through fine distribution of the wet waste material in quantities which are low in relation to the bed mass, the fine distribution being made into the bed mass. Thus, the smallest particles of the fresh waste material come into contact with heat-producing particles of decaying matter which are already undergoing the precomposting process, so that the excess heat can immediately be utilized for evaporating the high water content of the fresh particles. At the same time, the fresh particles undergoing the initial stages of aerobic decomposition will supply and distribute new energy, as a result of which the continuity of the heat development and evaporation is maintained.

Each organic substance has a certain inherent aerobic period of time required for decomposition. During this time, under optimal conditions, excess heat is released, i.e., more heat is produced during this time than is required for maintaining the desired aerobic decomposition process. The aerobic precompost process for drying wet organic waste matter is preferably completed as soon as the precomposting particles of decaying matter no longer supply excess heat. For example, the time required for precomposting fresh sewage silt amounts to 10 to 14 days. Thus, if the decaying matter of the bed mass is turned, for example, once every two hours, and if at the same time one quarter of the day's output, calculated as 8 hours, is added, a mixture ratio is obtained of fresh waste material to precomposted decaying matter of at least 1:40.

This disparity between the quantity of fresh waste material to be added and the precomposting decaying matter results in extraordinarily stable conditions, particularly with respect to the water content in the bed. Thus, in the event that there are any fluctuations in the water content of the fresh waste material, they have no significant influence. The method of the instant invention, therefore, permits intensive drying of wet organic waste materials, particularly fresh sludge, since the excess self-induced temperature of the aerobic precompost process is utilized to its maximum extent.

In the event that specific wet waste materials, particularly sludges, cannot be dewatered by mechanical means to the required water content, the method of this invention can be supplemented by the following additional steps:

Fresh sludge in particular can be subjected to a brief continuous predecaying phase lasting from 1 to 2 days. During this period of time, cell water is released so that it can be squeezed out mechanically.

Subsequently, the fresh waste matter can enter the drying phase by means of a precompost process.

As a result of using the predecaying phase with the method of the instant invention, the thermal process which was frequently necessary in prior art methods can be eliminated. Further, this predecay process achieves the same result as the already known, expensive, freeze drying wherein the cells are destroyed through freezing and the released cell water is squeezed out after a thawing step. Additionally, the loosening up of the decaying matter can be increased by sifting pre- or end-composted decay matter, air drying the bulky fibrous sifted matter, and refeeding the same into the bed together with the fresh waste matter as supporting material for loosening up the bed. If this refeeding step is performed several times, thereby enriching the bed with the loose supporting matter, such matter is itself further composted as a result of the repeated passages.

The drying of wet organic waste matter through a precompost process is, accordingly, significantly improved by mixing fresh waste matter with the precomposting decaying matter of the bed. A further significant improvement can be obtained by adding carbon, or carbon-containing additives such as waste paper, wood scraps, straw or, preferably, peat. These additives not only loosen up the bed mass but, moreover, they contribute to increasing the excess heat during aerobic decomposition. This, of course, causes a substantial increase in the drying capacity of the precomposting decay matter.

The method of the instant invention is suitable for drying refuse, particularly for drying mixtures of sludges and refuse, and more particularly for drying sludges alone. By using this method it is now economically possible, for the first time, to predry and precompost fresh sludges from sewage plants having water contents of 60–65% to such a degree that they may merely be subjected to any desirable post-compost process, i.e., a sterilizing operation. This is of great economic significance, particularly since, as a direct result of the use of this method, the heretofore used expensive digestion chambers in sewage plants can be eliminated. By using the instant method wet waste matter can, in practice, be dried to the same degree as has hitherto been customary. For this purpose, the waste material is kept, depending upon the type, from 5 to 10, and when working with fresh sewage sludge preferably from 10 to 14 days in the precompost phase, during which the waste matter is turned several times daily.

The waste matter dried according to the method of this invention can now be subjected to any desirable post-compost process such as one of the known hygienization or sterilizing methods. Moreover, it is possible in smaller compost process plants to provide the precompost step as the first process step immediately prior to the composting process as such, so that both process steps essentially merge into one. However, it is recommended that in larger compost plants the post-compost process be performed separately from the precompost process since, as a rule, the post-compost process does not require as expensive apparatus as that used in the precompost process.

The mode of the drying operation is such that a quantity of fresh waste matter which is small in relation to the bed mass is mixed in the area extending over the entire length of a first dimension of the bed and over the entire length of a second dimension of the bed lying transversely to the first dimension. The fresh waste matter has a water content exceeding the water content suitable for the precompost operation and the mixing, which is done progressively, is performed by way of fine distribution into the bed mass which has a water content suitable for the precompost process. In order to accomplish this the fresh waste matter is finely distributed over the entire length of the first dimension of the bed. Thus, the entire area into which the fresh waste matter is to be mixed has been covered in a primary stage with the fresh material.

It is preferable that the precomposting decaying matter be conveyed transversely to the second dimension of the bed, preferably simultaneously with the turning operation of the bed, to a discharge side of the same. At the discharge side, a part of the precomposted decaying matter can be removed and a second part can be conveyed back to the opposite side of the bed. This permits a more intensive mixing of the decaying matter. The mixing in of the fresh waste matter in the area extending over the entire length of the first dimension can also be achieved by adding the fresh waste matter finely distributed over only one part of the entire length of the first dimension, preferably at the removal side of the opposite line side of the bed. If this is done, it is necessary that, as mentioned above, a part of the bed mass at the removal side be conveyed back to the opposite line side. This makes it possible to mix the fresh matter into the bed in the area extending over the entire length of the first dimension.

The periodic turning operation of the bed mass can be performed in any suitable manner. It is preferred, however, that the bed mass be turned progressively in the area extending over the entire length of the first dimension and in the direction of the second dimension. It is also preferred that the addition of the fresh waste matter be combined with the turning operation such that the fresh waste matter is added along with that part of the bed mass affected by the turning operation. The precomposted decaying matter can be taken off the bed as desired. Thus, it is possible to draw the precomposted decaying matter off the surface in the area extending over the entire length of the first dimension of the bed and over the entire length of the dimension of the bed line transversely thereto in a progressive manner. It is preferred, however, that the precomposted decaying matter be taken off along one side of the bed, i.e., the removal side.

The shape of the bed in which the precomposting decaying matter is arranged can have any desired configuration. Especially favorable conditions are obtained, however, if the bed is arranged in an annular shape, most suitably in a receptacle, and if the radial distance between the circumferential sides is selected as the first dimension of the bed.

Turning now to the drawings, it should be noted that since the difficulties which develop in the drying of organic waste matter, with respect to water content and admission of air, normally manifest themselves when treating sewage silts, the preferred embodiments of this invention will be described with regard to precomposting of sewage sludge. Naturally, this does not exclude composting of other organic waste matter by means of the apparatus of the instant invention. In particular, sewage sludge in combination with refuse or other organic substances can be dried.

Figure 2:
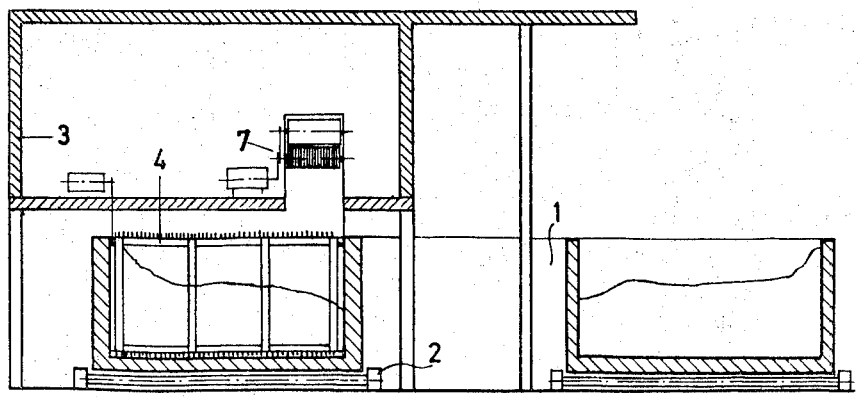
FIG. 2 is a vertical section view taken on the line II—II of FIG. 1.
Figure 3:
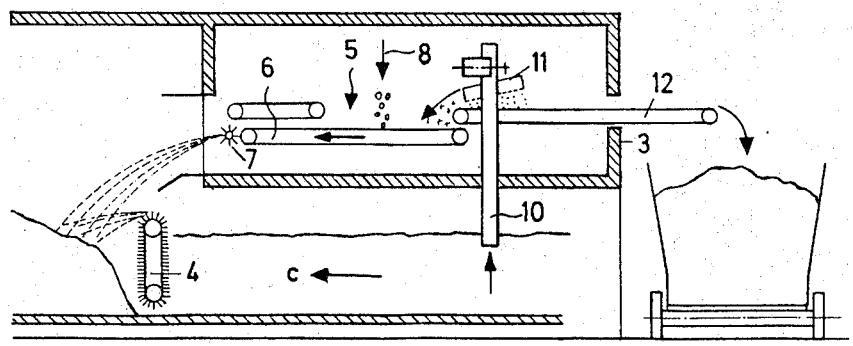
FIG. 3 is a sectional view taken on the line III—III of FIG. 1.

The drying device depicted in FIGS. 1–3, for performing the precomposting process includes an annular receptacle 1 which is supported on two rollers 2 and rotates about its axis in the direction represented by the arrow C. The floor and side walls forming the precompost champer of the annular receptacle 1 are insulated so that the entire self-induced temperature which develops during the aerobic decomposition, can be utilized to the greatest extent possible, for the evaporation of liquid.

A working platform 3, preferably having a roof, is provided for on a stationary support above the annular receptacle 1, and serves to carry certain other components of the precomposting device. Working platform 3 covers at least a portion of the area of the annular receptacle and could, if desired, cover the entire receptacle.

Turning or circulating device 4 is provided at working platform 3, such turning device extending over the entire width of the annular cross-section and, preferably, being mounted at an adjustable angle α to the radius of the annular receptacle so that the turned, or circulated, matter is conveyed by a certain amount in the direction of the exterior edge of the receptacle. Thus, as the decaying matter is worked over each time, it is being conveyed, or circulated, from the inside toward the outside by means of the inclined position of the turning, or circulating, device 4 relative to the tangent of the conveying direction. By adjusting the angle, the transverse conveying can be increased or reduced. The circulating device 4 may consist of a vertically mounted conveyor belt equipped with teeth, although other suitable circulating devices can be used.

A depositing device 5 is mounted on the work platform 3 and is used to distribute the fresh waste matter at the inner annular region in the direction of the circulating device, as viewed in the direction of advance of the circulating device 4. The depositing device 5 is equipped with a conveyor belt 6 which is preferably adjustable in its speed. The fresh waste matter is finely fragmented and evenly distributed, and is deposited at 8 onto the conveyor belt.

The drying device of the present invention is further equipped with a conveyor device 9, preferably a worm conveyor, which is also secured to the work platform support and runs essentially horizontally. The conveyor device 9 extends over the width of the annular receptacle and is mounted such that it conveys back to the interior annular area the decaying matter accumulating in the exterior area of the receptacle 1. The conveyor device 9 provides an intensive transverse circulating effect and at the same time a constant feedback of the decaying matter into the mixing area of the raw matter. The inclined position of the circulating device 4 and the feedback through the conveyor device 9 causes an intensive mixing and homogenization of the entire contents of the receptacle 1 so that, in spite of local addition of the raw matter, the same is continuously mixed into the entire contents of the decaying matter.

The removal device 10, which is advantageously also mounted at the working platform 3, has a sifting device 11 connected thereto which has associated therewith a discharge device 12 for the precomposted decaying matter and is also coupled with the depositing device 5 for disposal of the sifted material. With this arrangement it is possible to free the precomposted decaying matter of coarse components and at the same time add those coarse components back to the bed via the depositing device 5.

This, as already mentioned, helps to loosen the decaying matter further. The coarse matter which has been sifted from the precomposted matter in sifting device 11 is preferably dried prior to adding it to the bed. This drying permits the coarse matter to absorb a part of the moisture as well as to loosen the decaying matter.

Figure 4:
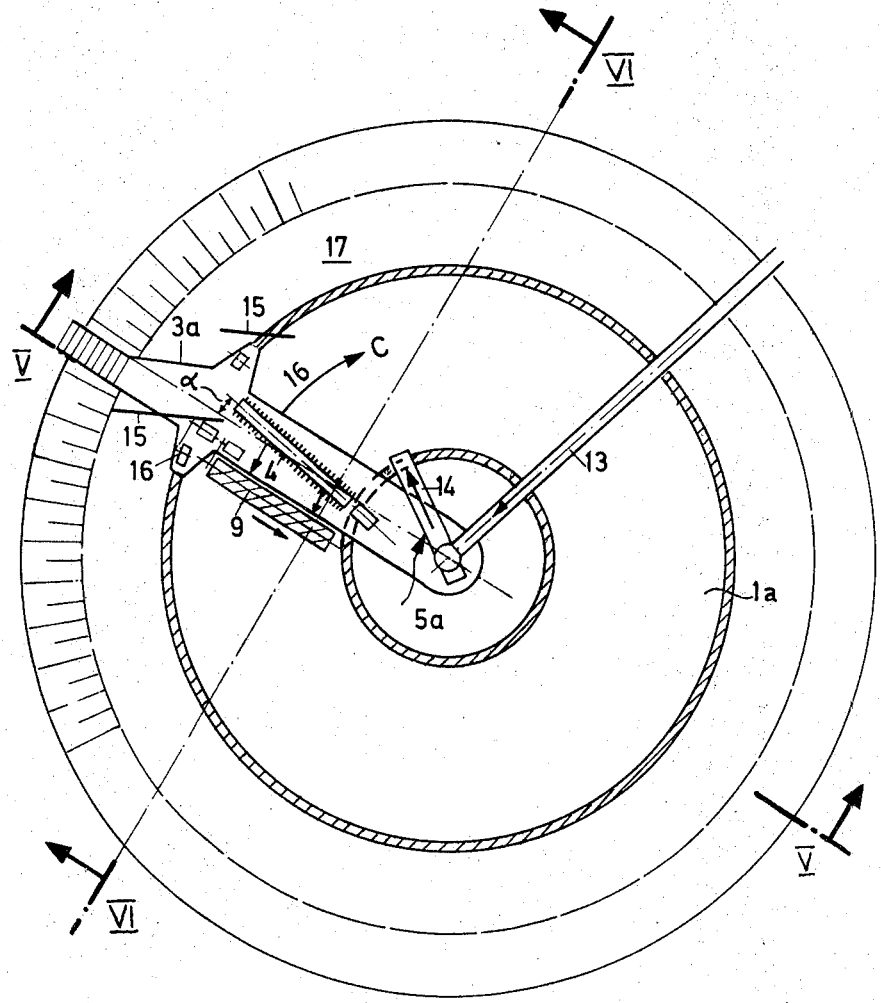
FIG. 4 is a top plan view of another embodiment of the present invention having a stationary annular receptacle and revolving accessory means.
Figure 5:
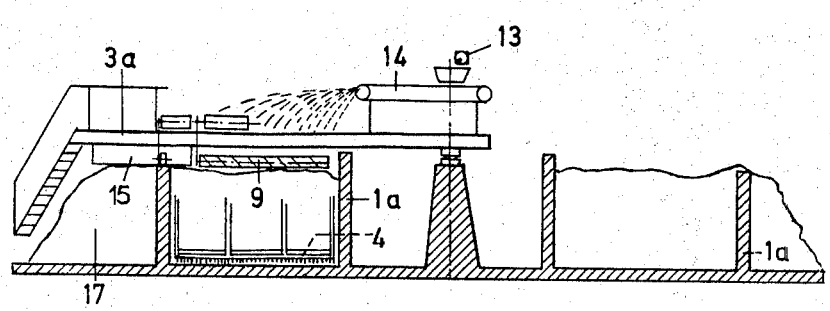
FIG. 5 is a vertical sectional view taken on the line V—V of FIG. 4.
Figure 6:
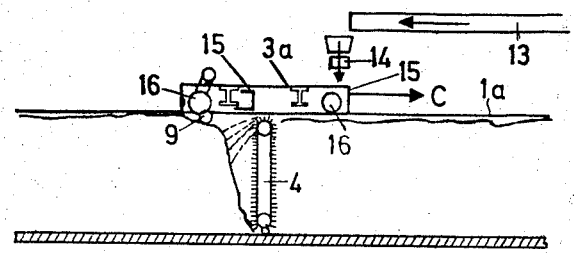
FIG. 6 is a vertical sectional view taken on the line VI—VI of FIG. 4.

Another embodiment of the apparatus of the present invention is depicted in FIGS. 4 to 6. In this embodiment the annular receptacle 1a is constructed as a stationary receptacle. The accessory devices are mounted on working platform 3a which revolves in the direction indicated by the arrow C. The working platform 3a also carries the circulating device 4 as well as the conveyor device 9 for shifting the precomposted waste matter which has accumulated at the edge of the receptacle.

Also mounted on work platform 3a is the depositing device 5a which, unlike the embodiment of FIG. 1, does not eject the fresh waste matter in a direction tangential to the annular receptacle, but rather in a radial direction. Depositing device 5a is equipped with a stationary conveyor belt 13 which delivers to conveyor belt 14 revolving with the working platform. Conveyor belt 14 is adjustable in its speed so that fresh waste matter can be delivered to only a part of the annular width or the entire annular width, depending upon the speed of conveyor 14.

The precomposted decaying matter accumulating at the exterior edge can be conveyed across the exterior edge by means of scraper 15 provided for in front of drive wheels 16. The exterior annular-shaped zone 17 adjoining the annular receptacle 1a can be utilized as storage for the precomposted waste matter. The functional method of the embodiment of the drying device shown in FIGS. 4–6, is analogous to that of the embodiment shown in FIGS. 1–3.

As already mentioned, the above-described drying devices are suitable for all organic waste matter having a water content exceeding that suitable for precomposting using ordinary methods. In particular, fresh sludges belong in this category. If it is desired that the drying devices also process refuse, it is necessary to preliminarily prepare the same according to conventional methods, i.e., segregating coarse components from the raw refuse and crushing the same if necessary. Further, the raw refuse must be freed of metallic particles.

If the inventive method for drying wet organic waste matter, and in particular fresh sludge, through aerobic precomposting is to be combined immediately with the post-composting, so that the processes are essentially merged with each other without any clear delineation between the two, the above-described devices can be enlarged so that they will contain a further exterior ringed area which will then contain the post-composting stage. It should be noted, however, that the post-composting stage, contrary to the precomposting stage, must be performed in a known manner such that fresh waste matter is not heaped upon the composting decaying matter. The necessity of periodically circulating the composting decaying matter in the post-composting stage is also applicable, but other than that the decaying matter is to be conveyed without other interruptions to the discharge side. This type of combination of drying or precomposting stage, and post-composting stage, is primarily suitable for smaller compost plants. In large compost plants, the drying or precomposting stage will be performed in separate phases. This is also done particularly for the reason that the treatment of the decaying matter in the precomposting stage is substantially more difficult than in the post-composting stage and that, therefore, as a rule fewer devices are required for the precompost process. The post-compost process can be performed in a simpler device.

Thus, it can be seen that the objects set forth at the outset of this specification have been successfully achieved by reference to illustrative and preferred embodiments which, however, should not be taken as limiting the scope hereof.

What is claimed is:

1. A method for continuously drying wet organic waste matter, in particular fresh sludge, by aerobic precomposting, wherein the precomposting decaying matter is arranged in a bed of approximately uniform height throughout, said method comprising mixing fresh waste matter having a high water content into an area of said bed extending over the entire length of a first dimension and over the entire length of a second dimension lying transversely to said first dimension, the amount of said fresh waste matter being low in relation to the mass of said bed, said mixing being done progressively and through fine distribution into said bed mass, said bed mass having a water content suitable for precomposting, periodically circulating the material in said bed mass, and continuously removing precomposted decaying matter.

2. A method pursuant to claim 1, wherein said fresh waste matter is added over the entire length of said first dimension of said bed in finely broken up components.

3. A method pursuant to claim 1, wherein said bed has a removal side and said precomposting decaying matter is conveyed to said removal side in a direction which is transverse to said second dimension, said conveying being performed simultaneously with said circulating, a portion of said precomposted decaying matter being removed at said removal side and another portion being fed back to the opposite side of said bed.

4. A method pursuant to claim 3, wherein said fresh waste matter is added in finely broken up parts over a part of the entire length of the first dimension at the side of the bed which is opposite to said removal side.

5. A method pursuant to claim 1, wherein the precomposted decaying matter is drawn off progressively from the surface of the bed, in the area extending over the entire length of a first dimension of the bed and over the entire length of the dimension of the bed lying transversely to said first dimension.

6. A method pursuant to claim 1, wherein said bed is rectangular and the longer side of said rectangle is said first dimension.

7. A method pursuant to claim 1, wherein said bed is annular-shaped and is contained in an annular receptacle, the radial distance between the circumferencial sides of said annular receptacle being said first dimension.

8. A method pursuant to claim 1, wherein said fresh waste matter is added in a ratio of 1 part of said fresh waste matter to about 20–40 parts of precomposting decaying matter.

9. A method pursuant to claim 1, wherein the fresh waste matter which is entering has a water content of about 60 to about 75 percent.

10. A method pursuant to claim 1, wherein said wet waste matter, in particular fresh sludge, is subjected to a predecaying process outside of said bed until such time as the cell water in said bed is released and partially removed before adding said wet waste matter to said bed as said fresh waste matter.

11. A method pursuant to claim 10, wherein said wet waste matter is subjected to said predecaying process for a period of about 1 to about 2 days.

12. A method pursuant to claim 1, wherein said decaying matter is precomposted for a period of from about 5 to about 14 days and is circulated at least twice daily.

13. A method pursuant to claim 1, further including the step of mixing with said precomposting decaying matter, for increasing the heat of the bed mass, a member of the group consisting of carbon and carbon containing additives.

14. A method pursuant to claim 13, wherein said carbon contained additives are selected from the group consisting of waste paper, wood shavings, straw and peat.

15. A method pursuant to claim 1, wherein said precomposting is performed as a first stage immediately prior to composting and said precomposted decaying matter is passed to said composting process in the absence of any intermediate stage.

16. Apparatus for continuously drying wet organic waste matter, in particular fresh sludge, by aerobic precomposting, comprising an annular receptacle, feeding means, and circulating means extending over the entire width of said annular receptacle, said feeding means being constructed such that it spreads fresh waste matter over at least a part of said entire width of said annular receptacle, said circulating means having a vertically directed circulatory conveyor means with teeth thereon, said conveyor means being mounted at an angle $\alpha$ to the radius of said annular receptacle and being inclined toward the discharge side of said receptacle.

17. Apparatus pursuant to claim 16, wherein the walls of said annular receptacle are heat insulated.

18. Apparatus pursuant to claim 16, wherein said feeding means is constructed such that it adds said fresh waste matter over the entire width of said annular receptacle.

19. Apparatus pursuant to claim 16, wherein said feeding means includes means for breaking up said waste matter.

20. Apparatus pursuant to claim 16, further including a dewatering means associated with said feeding means, for dewatering said wet waste matter.

21. Apparatus pursuant to claim 16, wherein said receptacle has a removal side, said apparatus further including conveyor means mounted over the width of said annular receptacle in such manner that it feeds back precomposted decaying matter accumulating at said removal side to the opposite side thereof.

22. Apparatus pursuant to claim 16, wherein said receptacle has a removal side, said apparatus further including removal means for the precomposted decaying matter at said removal side, and a sifting means connected thereto which has discharge means associated therewith for the sifted matter, that part of said discharge means having said sifted matter being coupled with said feeding means.

23. Apparatus pursuant to claim 21, wherein said receptacle is stationary, said apparatus further including an annular area outside of said annular receptacle and surrounding the same, said annular area serving as a storage area for said precomposted decaying matter, and scrapping means for conveying the precomposted decaying matter which accumulates at the exterior area of said receptacle toward said area.

24. Apparatus pursuant to claim 16, wherein said annular receptacle is rotatable, and said feeding means and circulating means are stationary and mounted at a working platform which at least partially covers said annular receptacle.

25. Apparatus pursuant to claim 16, which forms the first stage of a composting apparatus, wherein the bed zone of the precomposting stage merges at its removal side into the bed zone of the composting stage in the absence of an intermediate stage.

26. A method for continuously dewatering organic waste material having considerable water content, in particular, dewatering fresh sludge, so as to possess a water content suitable for aerobic precomposting, while simultaneously precomposting the waste material, comprising the steps of adding to the waste material arranged in a bed and undergoing aerobic composting and having a water content suitable for maintaing the composting process, such waste material having said considerable water content in a quantity of maximum 20% by weight of the mass of said bed per day, periodically circulating the entire mass during the continuous composting process, and removing the precomposted dewatered decaying matter.

References Cited

UNITED STATES PATENTS 2,183,463  12/1939  Moreton _____ 34—9X
3,345,052  10/1967  Hall _____ 263—28X JOHN J. CAMBY, Primary Examiner U.S. Cl. X.R.

110—8